(12) United States Patent
Zimbron et al.

(10) Patent No.: US 10,112,854 B2
(45) Date of Patent: Oct. 30, 2018

(54) OLEOPHILIC BIO-BARRIER FOR CONTROLLING NAPL MIGRATION

(71) Applicants: COLORADO STATE UNIVERSITY RESEARCH FOUNDATION, Fort Collins, CO (US); Chevron U.S.A. Inc., San Ramon, CA (US); Arcadis Corporate Services, Inc., Highlands Ranch, CO (US)

(72) Inventors: Julio A. Zimbron, Fort Collins, CO (US); Thomas C. Sale, Bellvue, CO (US); Matthew J. Biondolillo, Pennellville, NY (US); Philip H. Batten, Manlius, NY (US); Marc Chalfant, Fort Collins, CO (US); Mark Lyverse, Lafayette, CA (US)

(73) Assignees: Colorado State University Research Foundation, Fort Collins, CO (US); Chevron U.S.A. Inc., San Ramon, CA (US); Arcadis Corporate Services, Inc., Highlands Ranch, CO (US)

( * ) Notice: Subject to any disclaimer, the term of this patent is extended or adjusted under 35 U.S.C. 154(b) by 221 days.

(21) Appl. No.: 14/485,631

(22) Filed: Sep. 12, 2014

(65) Prior Publication Data
US 2016/0075576 A1    Mar. 17, 2016

(51) Int. Cl.
| | |
|---|---|
| *C02F 1/40* | (2006.01) |
| *C02F 3/06* | (2006.01) |
| *C02F 1/28* | (2006.01) |
| *C02F 3/02* | (2006.01) |
| *C02F 101/32* | (2006.01) |
| *C02F 103/06* | (2006.01) |

(52) U.S. Cl.
CPC ............ *C02F 3/02* (2013.01); *C02F 2101/32* (2013.01); *C02F 2103/06* (2013.01); *Y02W 10/15* (2015.05)

(58) Field of Classification Search
CPC .......... B01D 17/0202; B01D 2257/702; B09C 1/10; B09C 1/00; B09C 1/002; B09C 2101/00; Y10S 210/924; Y10S 210/901; B01J 20/28033; C02F 1/285; B32B 2307/726; C09K 3/32; E02B 15/06
USPC .................. 210/924, 242.2, 693, 671, 17.01; 405/128.15, 129.45
See application file for complete search history.

(56) References Cited

U.S. PATENT DOCUMENTS

| | | | |
|---|---|---|---|
| 7,128,498 B2 * | 10/2006 | Sheahan | ................... B32B 5/26 405/128.75 |
| 8,419,314 B1 | 4/2013 | McLinn et al. | |
| 8,651,768 B1 | 2/2014 | McLinn et al. | |
| 9,085,021 B1 | 7/2015 | Rice et al. | |

(Continued)

*Primary Examiner* — Claire A Norris
(74) *Attorney, Agent, or Firm* — Polsinelli PC (57) ABSTRACT

A method for controlling petroleum hydrocarbon (NAPL) sheen releases resulting from seeps, ebullition and erosion, on water surfaces, is described. An oleophilic bio-Barrier (OBBs), which may include a composite of hydrocarbon sorptive materials through which water is readily conducted, is placed at a groundwater/surface water interface (GSI) for promoting natural aerobic degradation of the intercepted/adsorbed NAPL through natural cycling of aerobic surface water and/or atmospheric oxygen. OBBs may be protected by structural covers (i.e., sand and rock gabions, as examples).

8 Claims, 5 Drawing Sheets

(56) References Cited

U.S. PATENT DOCUMENTS

2006/0000767 A1\* 1/2006 Trauger ................. B09C 1/002
                                                      210/503
2009/0110486 A1\* 4/2009 McLinn ............... B09B 3/0025
                                                    405/128.1
2009/0321351 A1\* 12/2009 Young .................... B08B 17/00
                                                      210/615

\* cited by examiner

OLEOPHILIC BIO-BARRIER FOR CONTROLLING NAPL MIGRATION

FIELD OF THE INVENTION

The present invention relates generally to controlling films of petroleum liquid on water and, more particularly, to the use of oleophilic bio-barriers for immobilizing petroleum liquid such that it can be digested by aerobic bacteria.

BACKGROUND OF THE INVENTION

Many oil production, transmission, refining, storage, and retail facilities are located adjacent to surface water bodies. Periodic, or sporadic sheens (iridescent films of petroleum hydrocarbons), correlating to low surface water conditions, high surface water conditions, or seasonal conditions, often appear on surface water. Petroleum sheens occur when petroleum liquids (referred to as Nonaqueous Phase Liquids (NAPLs)) with a positive spreading coefficient are introduced to an air-water interface in surface water bodies. NAPLs spread across air-water interfaces until interfacial forces at the leading edge of the sheen are balanced or natural processes deplete the petroleum liquids. Most petroleum NAPLs, including crude oil, fuels, and lubricants, tend to spread across surface water. Spreading can be enhanced by biosurfactants that are associated with biological assimilation of NAPLs in subsurface media including sediments, soils, and rock. Petroleum sheens in surface water can lead to violations of the Clean Water Act and a need for costly remedies.

Sheens are sufficiently thin that the equivalent amount of petroleum liquids can be as low as liters per square kilometer; ten liters per square kilometer equates to a thickness of 0.00001 mm. Clearly, the mass of contaminant that needs to be addressed can be very small when compared to the amounts of petroleum in surface water oil slicks and/or subsurface NAPL releases. Although sheens are commonly associated with releases of petroleum liquids, they can also be due to biological degradation of naturally occurring organics (i.e., plant material). Iridescent coloration of sheens is due to the refraction of light through NAPL layers having varied thicknesses.

Hydrocarbons associated with petroleum are subject to a diverse set of natural attenuation processes. In the case of sheens on surface water, natural loss processes include volatilization, microbially mediated aerobic degradation, and dissolution into water. In sediments and groundwater systems, microbially mediated anaerobic processes can also play an important role in mitigating impacts associated with petroleum at groundwater-surface water interfaces. Depending on the composition of released petroleum and environmental conditions, sheens can persist for minutes to days. Natural losses prevent sheens from being a more common problem.

Mechanisms of releases and factors controlling NAPL assimilation include: seeps, ebullition and erosion. Often, seeps appear at low surface water periods, where groundwater discharges from the banks into surface water, and NAPL near groundwater surface water interfaces, can be driven into surface water. Gases often become entrapped in petroleum impacted sediments or soils through biological processes and/or fluctuating water levels. Similar to surface water, a thin film of petroleum liquid can form between the air and water within a gas bubble in soil. Release of gas bubbles with films of petroleum liquids, from soils or sediment, is referred to as "ebullition." Often the release of one bubble leads to the coalescing of multiple bubbles and episodic releases. Another mechanism for generating sheens is erosion of sediments and soils. Erosion can occur at high flows along rivers, due to storm-related wave actions, construction activities, and/or ice scour.

Groundwater/surface water interfaces provide transitions between anaerobic and aerobic conditions under which petroleum hydrocarbons are naturally attenuated. Under certain circumstances, including cold weather that constrains rates of biological assimilation, increased upgradient new releases, high water stage, and/or low water stage, as examples, assimilative capacities of bacteria are exceed, and releases occur to surface water in the form of sheens.

Figure 1A:
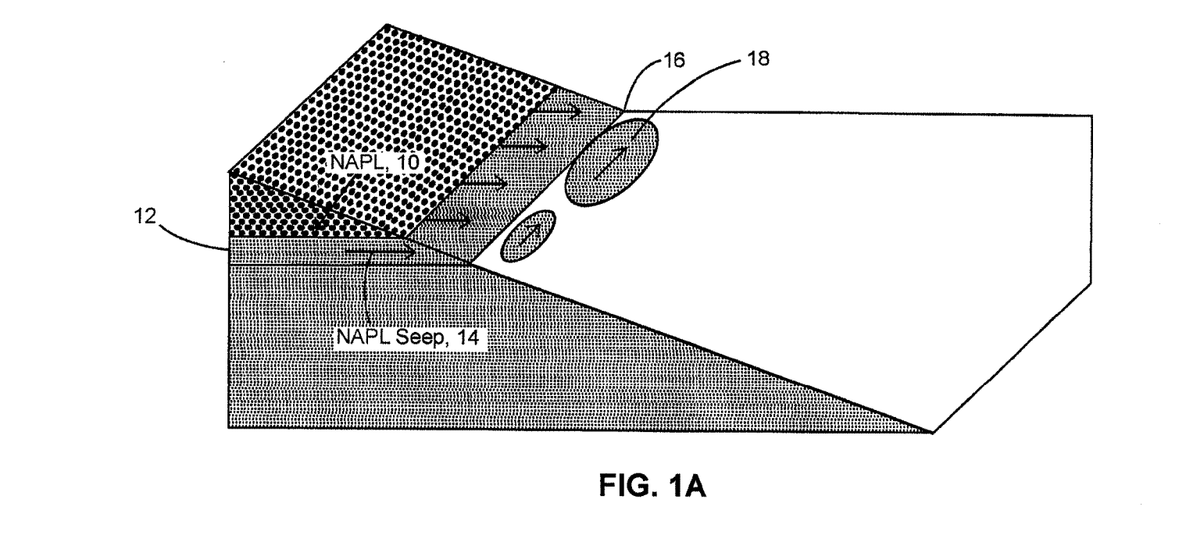
Figure 1B:
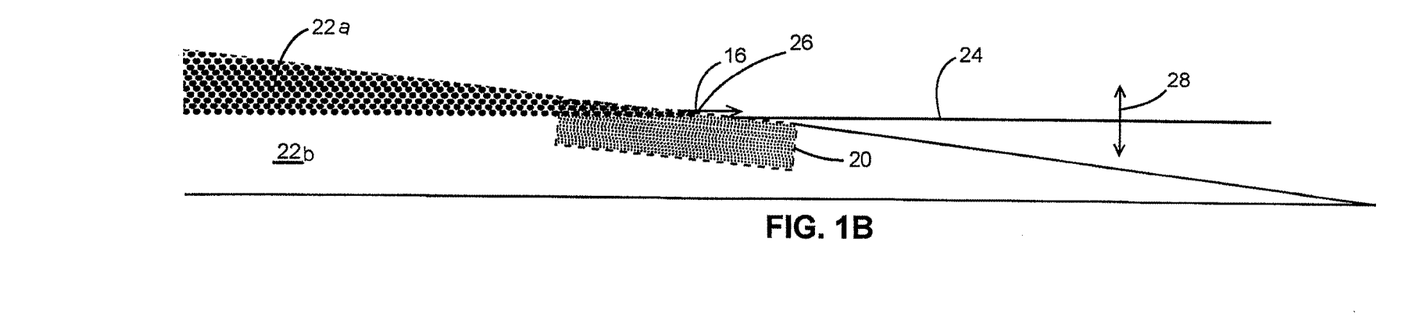
FIG. 1B illustrates an aerobic attenuation zone located at a soil/water interface, where the arrows illustrate the rise and fall of the surface water.
Figure 6:
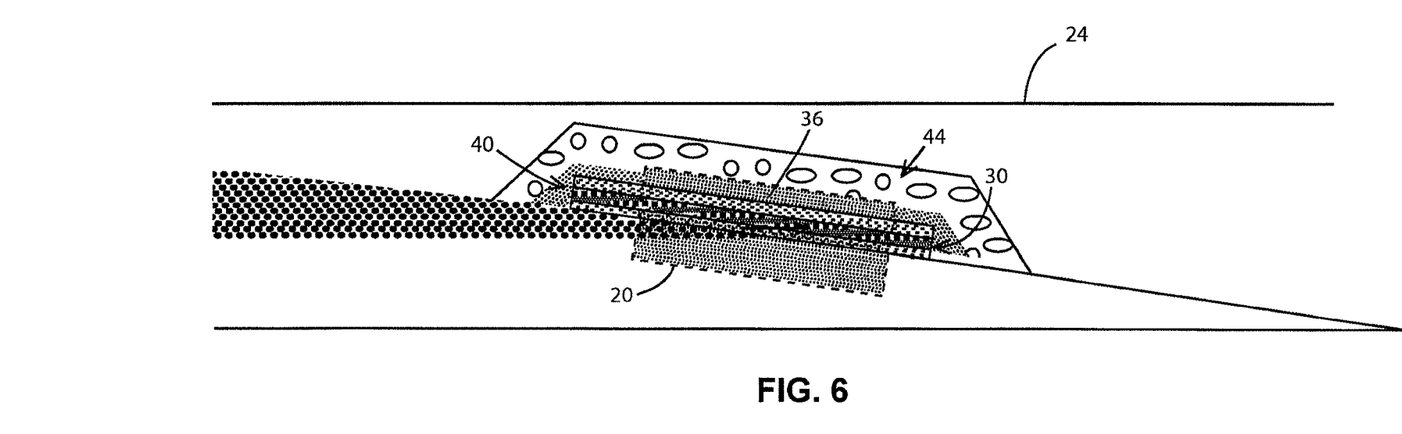
FIG. 6 is a schematic representation of the oleophilic geocomposite, shown in FIG. 5, but without an additional geotextile layer between the sand layer and the rock, submerged at high water level, wherein oxygen and nutrients are delivered to the geocomposite by invasion of surface water.

FIG. 1A illustrates NAPL, 10, located in ground water, 12, in soil or rock, +seeping, 14, toward ground water/surface water interface, 16, and ultimately forming growing sheen, 18, while FIG. 1B illustrates aerobic attenuation zone, 20, located at soil, 22, water, 24, interface 16, showing seep line, 26. Vertical arrows, 28, illustrate the rise and fall of surface water 24. Note that soil, 22a, is shown as being above the surface water, while soil, 22b, is below the surface water. In FIG. 6, discussed in detail hereinbelow, soil 22a and 22b are shown as being submerged.

Remedies for sheens have included physical barriers (i.e., sheet pile walls), recovery of fluids, and adsorbent barriers. These elements have been employed individually and/or in combinations. For example, remedy elements at a former refinery adjacent to a river included: (a) moving the river; (b) driving a 4,000 foot sheet pile wall through clean fill; (c) maintaining an inward hydraulic gradient across the barrier; (d) hydraulic recovery of upgradient LNAPL; (e) catholic protection of the barrier; (f) temporary sorbent booms; and (g) chronic monitoring. This remedy has been proven to be effective over a fifteen-year period; however, associated costs for capital and operations and maintenance have been large. In some instances, remedies may involve combined technologies. As an example, failure of a capillary barrier can be prevented through hydraulic recovery of NAPL that accumulates upgradient of a capillary barrier. The downside of the combination is that hydraulic recovery is an active, versus a passive, remedy. Many remedies for sheens (even expensive ones) fail. Factors leading to failure include: (a) insufficient adsorption capacity in the barrier for preventing ultimate failure due to overloading; (b) incomplete characterization of impacted soils/sediments; (c) NAPL bypass around or through components; and/or (d) finite life-times of components.

SUMMARY OF THE INVENTION

Embodiments of the present invention overcome the disadvantages and limitations of the prior art by providing a method for controlling sheens of petroleum hydrocarbons by enhancing natural losses of petroleum hydrocarbons at surface water/groundwater interfaces.

Another object of embodiments of the present invention is to provide a method for immobilizing petroleum hydrocarbons such that natural aerobic bacteria can effectively degrade these hydrocarbons.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the method for controlling petroleum hydrocarbons discharged from ground water to surface water at a ground interface, hereof includes: placing a first water and air transmissive mat (geotextile) having an upper surface and a lower surface, comprising oleophilic material effective for supporting growth of naturally occurring microbes, with the lower surface in contact with the ground in the region of said ground interface, such that the petroleum hydrocarbons are adsorbed by the first mat; and whereby the petroleum hydrocarbons are attenuated from biodegradation by the microbes, thereby preventing release thereof to the surface water.

In another aspect of the present invention, and in accordance with its objects and purposes, the method for controlling petroleum hydrocarbons discharged from ground water to surface water at a ground interface, hereof includes: placing a first water and air transmissive mat (geotextile) having an upper surface and a lower surface, comprising oleophilic material effective for supporting growth of naturally occurring microbes, with the lower surface in contact with the ground in the region of said ground interface, such that the petroleum hydrocarbons are adsorbed by the first mat; contacting an oleophilic open structural layer (geonet) with the upper surface of the first mat; and placing a second water and air transmissive mat (geotextile) having an upper surface and a lower surface, comprising oleophilic material effective for supporting growth of naturally occurring microbes, with the lower surface thereof in contact with the structural layer, forming thereby a sandwich structure (geocomposite) having open ends; whereby air transfer to the upper surface of the first mat and the lower surface of the second mat is improved, and the petroleum hydrocarbons are attenuated from biodegradation by the microbes, thereby preventing release thereof to the surface water.

In yet another aspect of the present invention, and in accordance with its objects and purposes, the apparatus for controlling petroleum hydrocarbons discharged from ground water to surface water at a ground interface, hereof includes: a first water and air transmissive mat (geotextile) having an upper surface and a lower surface, comprising oleophilic material effective for supporting growth of naturally occurring microbes, wherein the lower surface is in contact with the ground in the region of the ground interface, such that the petroleum hydrocarbons are adsorbed by the first mat; a layer of sand covering the upper surface of the first mat; a second water and air transmissive mat in contact with the sand-covered first mat; and a layer of rock covering the second mat.

In still another aspect of the present invention, and in accordance with its objects and purposes, the apparatus for controlling petroleum hydrocarbons discharged from ground water to surface water at a ground interface, hereof includes: a first water and air transmissive mat (geotextile) having an upper surface and a lower surface, comprising oleophilic material effective for supporting growth of naturally occurring microbes, wherein the lower surface is in contact with the ground in the region of the ground interface, such that the petroleum hydrocarbons are adsorbed by the first mat; an oleophilic open structural layer (geonet) in contact with the upper surface of the first mat; a second water and air transmissive mat (geotextile) having an upper surface and a lower surface, comprising oleophilic material effective for supporting growth of naturally occurring microbes, wherein the lower surface thereof is in contact with structural layer, forming thereby a sandwich structure (geocomposite) having open ends; a layer of sand covering the upper surface of the second mat; a third water and air transmissive mat in contact with the sand-covered second mat; and a layer of rock covering the second mat.

In another aspect of the present invention, and in accordance with its objects and purposes, the apparatus for controlling petroleum hydrocarbons discharged from ground water to surface water at a ground interface, hereof includes: a first water and air transmissive mat (geotextile) having an upper surface and a lower surface, comprising oleophilic material effective for supporting growth of naturally occurring microbes, wherein the lower surface is in contact with the ground in the region of the ground interface, such that the petroleum hydrocarbons are adsorbed by the first mat; an oleophilic open structural layer (geonet) in contact with the upper surface of the first mat; a second water and air transmissive mat (geotextile) having an upper surface and a lower surface, comprising oleophilic material effective for supporting growth of naturally occurring microbes, wherein the lower surface thereof is in contact with the structural layer, forming thereby a sandwich structure having open ends; at least one third water and air transmissive mat (geotextile) having an upper surface and a lower surface, comprising oleophilic material effective for supporting growth of naturally occurring microbes, wherein the lower surface is in contact with the upper surface of the second water and air transmissive mat; at least one second oleophilic open structural layer (geonet) in contact with the upper surface of the at least one third mat; at least one fourth water and air transmissive mat (geotextile) having an upper surface and a lower surface, comprising oleophilic material effective for supporting growth of naturally occurring microbes, wherein the lower surface thereof is in contact with the at least one second structural layer, forming thereby at least one second sandwich structure (geocomposite) having open ends; a layer of sand covering the upper surface of the fourth mat; a fifth water and air transmissive mat in contact with the sand-covered fourth mat; and a layer of rock covering the fifth mat.

Benefits and advantages of embodiments of the present invention include, but are not limited to, providing a method for reducing sheens of petroleum hydrocarbons at surface water/ground water interfaces, wherein inflow of nutrients in surface water into the bio-barrier element (e.g., oxygen, sulfate, nitrate, phosphate); the flow of atmospheric oxygen into the reference element; and/or the release of the byproducts of biological assimilation of petroleum hydrocarbon (i.e., methane, carbon dioxide, and polar hydrocarbons) are facilitated.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a perspective side view of FIG. 1A illustrates petroleum liquids (NAPL) located in ground water in soil or rock, seeping toward a ground water/surface water interface and ultimately forming expanding sheens, while

DETAILED DESCRIPTION OF THE INVENTION

Briefly, the present invention includes a method for remediation of petroleum hydrocarbon (NAPL) sheen releases resulting from seeps, ebullition and erosion, on water surfaces. An oleophilic bio-barrier (OBB), which may include a composite of hydrocarbon sorptive materials through which water is readily conducted, is placed at a groundwater/surface water interface (GSI) for promoting natural aerobic biodegradation of the intercepted/adsorbed NAPL through natural cycling of aerobic surface water and/or atmospheric oxygen. OBBs may include a structural covers (i.e., sand and rock gabions, as examples). A difference between sheet pile, bentonite slurry, capillary, and organoclay barriers is that OBBs are reactive barriers that provide a more sustainable remedy for sheens that may last for extended periods, given loading that is less than their assimilative capacity.

It is anticipated that: (a) the present OBB procedure will be effective as long as NAPL stored in the bio-barrier element is less than the NAPL storage capacity of the bio-barrier element; and (b) any loading to the OBB in excess of its capacity is addressed by assimilative processing. For hydraulic or sorptive barriers having very limited natural losses, it is only a matter of time until the NAPL storage capacity will be exceeded and the remedy will fail. Further, remedies relying on barriers or adsorbent can also have the adverse effect of limiting natural losses of NAPL by limiting: (a) inflow of nutrients in surface water into the bio-barrier element (e.g., oxygen, sulfate, nitrate, phosphate); (b) the flow of atmospheric oxygen into the reference element; and/or (c) release of the byproducts of biological assimilation of petroleum hydrocarbon (i.e., methane, carbon dioxide, and polar hydrocarbons).

Figure 2A:
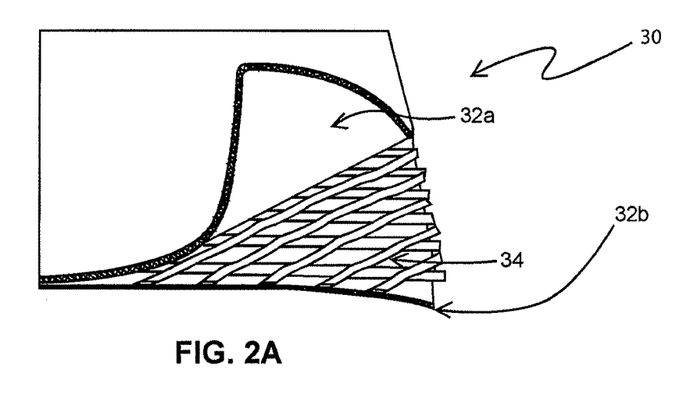
FIG. 2A is a schematic representation of an oleophilic geocomposite structure, illustrating nonwoven oleophilic polymeric material (geotextile) mats on top and bottom of an open polymeric geonet structure shown in FIG. 2B.
Figure 2B:
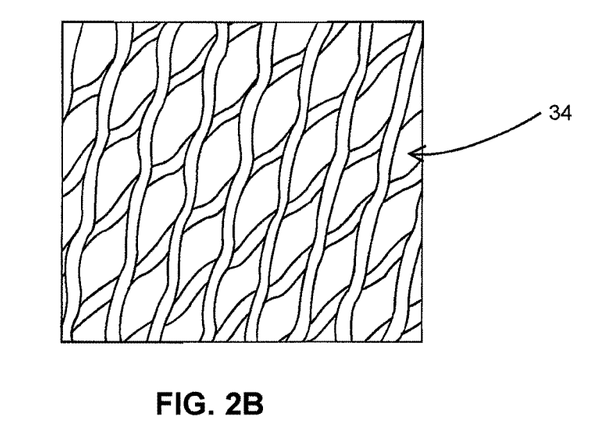

Reference will now be made in detail to the present embodiments of the invention, examples of which are illustrated in the accompanying drawings. It will be understood that the FIGURES are for the purpose of describing particular embodiments of the invention and are not intended to limit the invention thereto. Turning now to FIG. 2A, a schematic representation of oleophilic geocomposite material (OBB), 30, effective for adsorbing NAPL and as a substrate for natural aerobic microbes, is shown, illustrating porous, nonwoven oleophilic polymeric material geotextile mats or felt, 32a, and, 32b, on top and bottom of a polymeric geonet structure, 34, shown in FIG. 2B, forming thereby sandwich 30. This configuration permits flow of air and water containing oxygen through the sandwich such that aerobic microbes are exposed to the necessary nutrients in order to effectively degrade NAPL held in the oleophilic geocomposite. Mats 32a and 32b may include non-woven felt material, which may comprise pressed polymer fibers, while geonet structure 34 may include woven structural net material.

The geotextile and geonet materials may include any chemically stable material which absorbs petroleum hydrocarbons and permits bacterial colonization. Polypropylene is an example of an effective geotextile material, although other polymeric materials may be utilized including natural organic materials. Geonets are advantageously made from high density polyethylene. Laminated geocomposite sandwiches may have thicknesses of approximately 350 mil.

Figure 3:
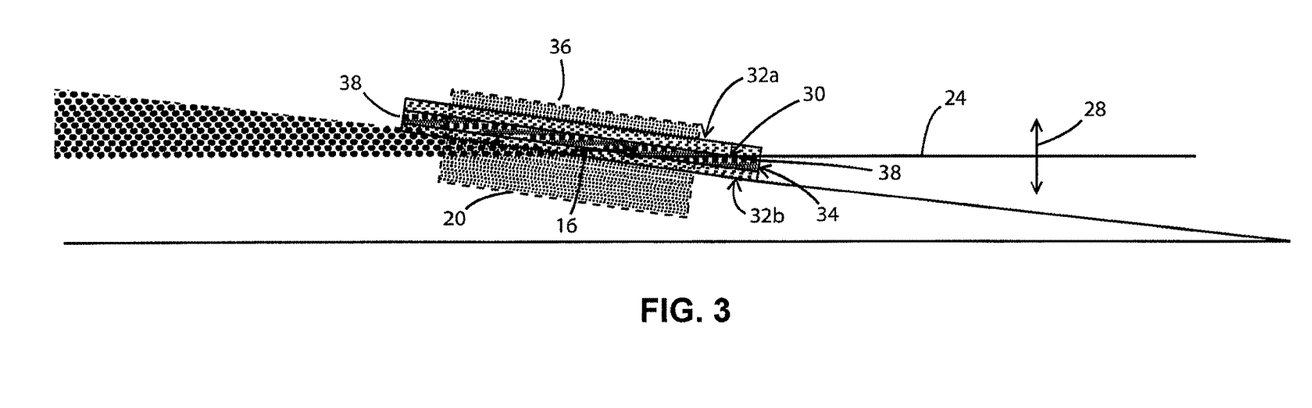
FIG. 3 is a schematic representation of the oleophilic geocomposite shown in FIG. 2A, disposed over the ground water/surface water interface, shown in FIG. 1B, serving as an adsorbing permeable reactive barrier.

FIG. 3 is a schematic representation of OBB 30 disposed over ground water/surface water interface, 16, and in contact with ground 22 serving as a reactive treatment barrier, 36, by: (a) adsorbing petroleum liquids (NAPLs); (b) facilitating delivery of surface water containing oxygen and/or atmospheric air containing oxygen; and (c) serving as a substrate for petroleum degrading microorganisms. Optionally, OBB 30 includes overlapping geotextile, not shown in FIG. 3, to close any open ends, 38, thereby limiting invasion of fine-grained sediments into the open space in the oleophilic adsorbent and providing additional oleophilic media for retention of NAPL.

It should be mentioned that geotextile mats can also be placed directly on the ground at seepage sites, without being part of a geocomposite structure. Additionally, OBB mats of either geotextiles or geocomposites, or combinations thereof, may be stacked, one upon the other, to increase the capacity of the OBB.

Figure 4:
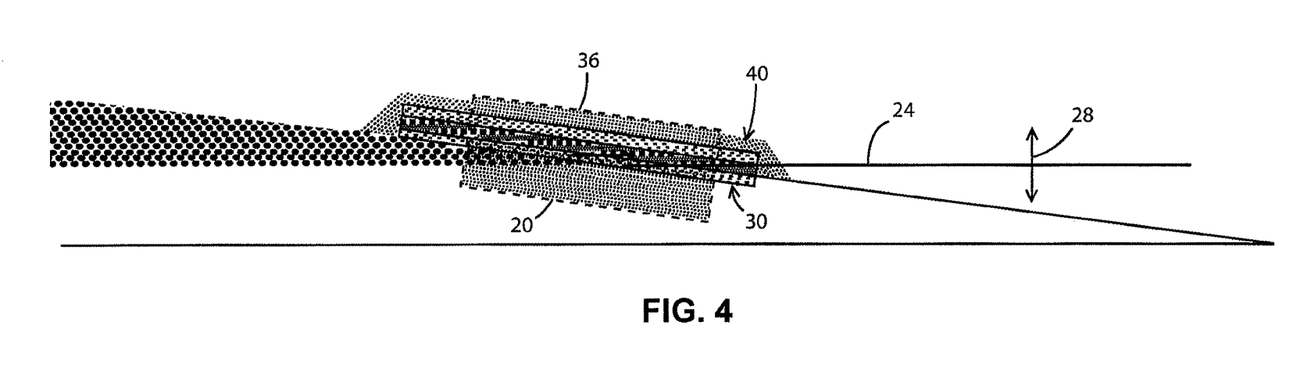
FIG. 4 is a schematic representation of the oleophilic geocomposite shown in FIG. 3, illustrating a fine-sand layer added above the geocomposite.

FIG. 4, is a schematic representation of OBB 30, illustrating fine-sand layer, 40, added above geocomposite 30 for: (a) increasing the capacity of the geocomposite to retain NAPL before releases to surface water; (b) providing a protective layer between the geocomposite and options for overlaying additional cover materials; and (c) limiting invasion of fine-grained material (silt-sediment) into the OBB Geocomposite.

Figure 5:
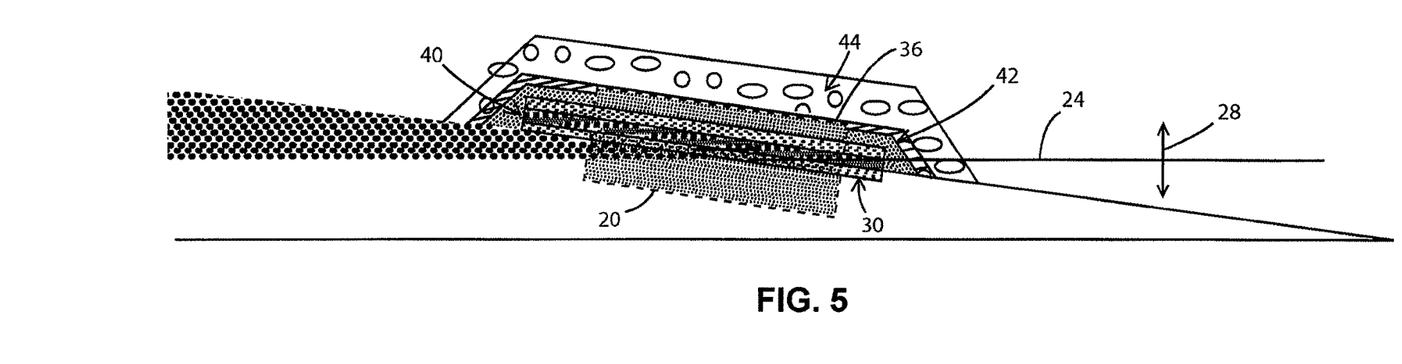
FIG. 5 is a schematic representation of the oleophilic geocomposite shown in FIG. 4, illustrating an additional layer of geotextile, which may be added above the fine sand, and an overlying cover of rock.

FIG. 5 is a schematic representation of OBB 30 illustrating an additional layer of geotextile, 42, which may be added above the fine sand to: (a) limit invasion of overlying cover, 44, (i.e. rock) into the underlying sand; (b) provide an additional layer of oleophilic material for capture of NAPL; and (c) limit invasion of fine-grained material into the OBB Geocomposite. Structural cover 44 can be added above the previously defined layers to address erosion via ice scour, stream flow, wave action, and/or collisions. Wire cages and anchors, not shown in FIG. 5, can also be included.

FIG. 6 is a schematic representation of OBB 30, as shown in FIG. 5, but without additional layer 42, submerged at high water level 24, wherein oxygen and nutrients are delivered to the OBB by invasion of surface water. Wave action may further facilitate cycling of fresh surface water through the barrier while it is submerged.

Figure 7:
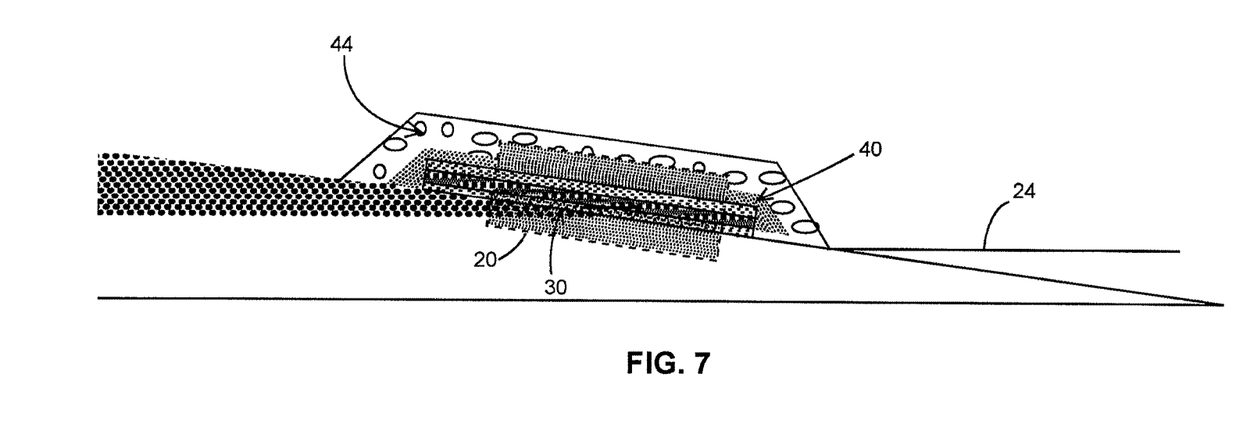
FIG. 7 is a schematic representation of the oleophilic geocomposite, shown in FIG. 6 exposed at low water level, wherein oxygen and nutrients are delivered to the geocomposite by invasion of atmospheric air containing oxygen.

FIG. 7 is a schematic representation of OBB 30 exposed at low water level 24, wherein oxygen and nutrients are delivered to the OBB via invasion of atmospheric air containing oxygen. Some water is retained on the media in the OBB by capillary forces, after drainage, as is NAPL. Wind and gas phase diffusion further facilitate delivery of oxygen under drained conditions.

Sporadic loading of NAPL to the OBB is retained and subsequently depleted via biological process. Active depletion of NAPL in OBBs overcomes the limitation of other procedures including use of capillary barriers, sheet pile walls, and organoclay barriers. Absent active depletion of NAPL for these procedures, they ultimately fail when their retention capacities are exceeded.

Figure 8:
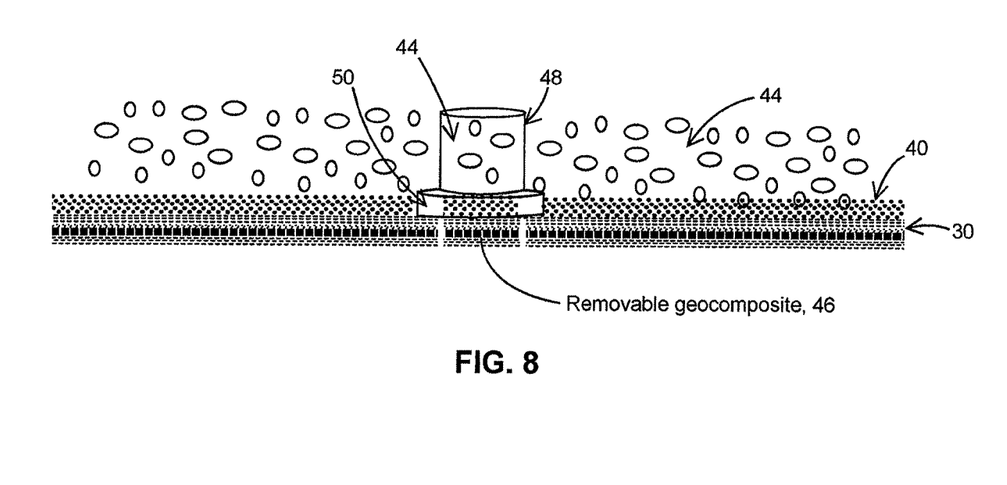
FIG. 8 is a schematic representation of a portion of the oleophilic geocomposite, illustrating a portion thereof being removable for monitoring purposes, and a section of pipe having a flange resting on the surface of the geocomposite for stability, for access to the removable portion of the barrier for inspection.

FIG. 8 is a schematic representation of a portion of OBB 30, illustrating portion, 46, thereof being removable for monitoring purposes, and a section of pipe, 48, having flange, 50, resting on the surface of the geocomposite for stability, for providing access to removable portion 46. In use, pipe section 48 would be filled with rocks, which may be removed when removable portion 46 is to be accessed. Wire baskets, not shown in FIG. 8, may be provided for ease of removal of rocks from pipe section 48. Multiple such sampling sites are anticipated.

Monitoring objectives include: (a) demonstration of control of sheens; (b) gaining insight regarding governing processes; (c) estimating NAPL fluxes; (d) evaluating performance of materials; and developing a basis for cost estimates. Sampling systems may be installed below the flanged sections of pipe for pore water sampling, temperature monitoring, pressure monitoring, as examples.

Having generally described the present invention, the following EXAMPLE is set forth to provide additional details.

EXAMPLE

A sheen control procedure in accordance with the teachings of the present in invention was implemented at a petroleum terminal on the Hudson River. Elements include: (a) an oleophilic mat that stores NAPL in the winter when freezing conditions constrain biological assimilation of NAPL; (b) twice daily, tidally driven, flushing of aerated surface water and atmospheric oxygen into the oleophilic mat and adjacent soil, promoting aerobic degradation during warm weather; and (c) a rock gabion cover to prevent winter ice scour. The Tendrain II OBB geocomposite was manufactured by SYNTEC, and was a boxed tri-planer geonet core with a thickness of 300 mil, bounded on both sides by a 10 oz. weight nonwoven polypropylene geotextile. The open ends of the geocomposite were wrapped with a NO80 polypropylene nonwoven geotextile fabric manufactured by ACF Environmental, with at least a 12 in. overlap top and bottom. A concrete sand layer of about 3 in. thick was placed over the geocomposite, and a 12 in. high, by 8 ft. width, by 12 ft. in length, RENO wire mesh mattress manufactured by Maccaferr was employed to hold rocks in place over the sand layer.

Routine visual inspections of the barrier indicate that the OBB is effectively controlling sheens in the areas where it has been deployed. Prior to deployment, sheens were observed at a frequency of approximately five times per year. Subsequent to deployment, no sheens have been observed where the OBB was deployed. In addition the structure cover was adequate to prevent ice scour during winter months. Routine water quality analyses show aerobic conditions in the OBB. Analyses of samples of the geocomposite show petroleum hydrocarbons being retained by the geocomposite. Water level data indicates cycling of surface water and entry of aerobic atmospheric air twice daily under most conditions.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for controlling hydrocarbons discharged from ground water to surface water at a ground water/surface water interface, comprising:
   placing an oleophilic biobarrier (OBB) in contact with the ground in the region of said ground water/surface water interface;
   leaving the OBB in contact with the ground at the ground water/surface water interface such that naturally occurring microbes colonize within the OBB;
   absorbing hydrocarbons discharged from the ground water to the surface water at the ground water/surface water interface at the OBB;
   wherein said OBB comprises a first mat having a first mat upper surface and a first mat lower surface, with the first mat lower surface in contact with the ground; an oleophilic open structural layer having a structural layer upper surface and a structural layer lower surface, with the structural layer lower surface in contact with the first mat upper surface; a second mat having a second mat upper surface and a second mat lower surface, with the second mat lower surface in contact with the structural layer upper surface, thereby forming a sandwich structure having open ends; and a sand layer located above the second mat upper surface for, at least in part, enhancing the adsorption of said hydrocarbons; whereby the first and second mat are each comprised of an oleophilic material that is nutrient, water and air transmissive and effective for supporting growth of said naturally occurring microbes; and whereby the OBB is configured such that nutrients, water and air are able to transfer through the OBB; and
   attenuating said hydrocarbons via biodegradation by the colonized naturally occurring microbes, thereby preventing release thereof from said ground water to said surface water;
   wherein said biodegradation by the colonized naturally occurring microbes is facilitated by cycling from surface water and/or atmospheric oxygen through the OBB due to the placement of the OBB in contact with the ground in the region of said ground water/surface water interface.

2. The method of claim 1, wherein the OBB further comprises a third mat over the sand-covered second mat, wherein the third mat is nutrient, water and air transmissive.

3. The method of claim 1, wherein the OBB further comprises a cover layer over the third mat, wherein the cover layer mechanically stabilizes the OBB, and limits erosion driven releases of absorbed hydrocarbons.

4. The method of claim 1, wherein the open ends of the OBB are covered with textile to limit sediment invasion into the OBB, wherein the textile is nutrient, water and air transmissive.

5. A method for remediation of non-aqueous phase liquid (NAPL) hydrocarbon sheens discharged from ground water to surface water at a ground water/surface water interface, the method comprising:
placing an oleophilic biobarrier (OBB) in contact with the ground in the region of said ground water/surface water interface
leaving the OBB in contact with the ground at the ground water/surface water interface such that naturally occurring microbes colonize within the OBB;
absorbing NAPL hydrocarbon sheens discharged from the ground water to the surface water at the ground water/surface water interface at the OBB;
wherein the OBB comprises a top mat and a bottom mat, each comprised of oleophilic material that is nutrient, water and air transmissive and effective for supporting colonization of naturally occurring microbes from the ground; an oleophilic open structural layer located between the top mat and bottom mat thereby forming a sandwich structure having open ends; and a sand layer located above the top mat for, at least in part, enhancing the adsorption of said NAPL hydrocarbon sheens; whereby the OBB is configured such that nutrients, water and air is able to transfer through the OBB; and
remediating said NAPL hydrocarbon sheets via biodegradation by the colonized naturally occurring microbes, thereby preventing release thereof from said ground water to said surface water;
wherein biodegradation by the colonized naturally occurring microbes is facilitated by cycling of surface water and/or atmospheric oxygen through the OBB due to the placement of the OBB in contact with the ground in the region of said ground water/surface water interface.

6. The method of claim 5, wherein the OBB further comprises a third mat over the sand-covered top mat.

7. The method of claim 6, wherein the OBB further comprises a cover layer over the third mat, wherein the cover layer over the third mat mechanically stabilizes the OBB, and limits erosion driven releases of absorbed NAPL hydrocarbon sheens.

8. The method of claim 5, wherein the open ends of the OBB are covered with textile to limit sediment invasion into the OBB, wherein the textile is water and air transmissive.

* * * * *